UNITED STATES PATENT OFFICE.

OTTO WOLFES AND HORST MAEDER, OF DARMSTADT, GERMANY.

TROPINONE-MONOCARBOXYLIC-ACID ESTERS AND PROCESS OF PREPARING THE SAME.

1,420,900.  Specification of Letters Patent.  Patented June 27, 1922.

No Drawing.   Application filed August 26, 1921. Serial No. 495,553.

*To all whom it may concern:*

Be it known that we, Dr. OTTO WOLFES, resident of Darmstadt, citizen of the German Republic, and Dr. HORST MAEDER, resident of Darmstadt, also a citizen of the Germany Republic, have invented certain new and useful Improvements in Tropinone-Monocarboxylic-Acid Esters and Processes of Preparing the Same (for which we have filed an application in Germany, June 16, 1920; Switzerland, May 24, 1921; Austria, May 24, 1921; Hungary, June 13, 1921; Czecho-Slovakia, June 14, 1921; Italy, May 30, 1921; Spain, June 9, 1921; France, June 8, 1921; England, June 15, 1921; Belgium, May 21, 1921; Holland, May 25, 1921; Denmark, May 28, 1921; Sweden, May 26, 1921, and Norway, May 25, 1921), of which the following is a clear, full, and exact description.

The objects of our invention are tropinone-mono-carboxylic acid-esters, unknown products and the process of preparing the products.

It is known (Journal of the Chemical Society of London, 1917, III/112 pages 762 et seq.) that tropinone can be obtained by treating the condensation products of succinic-dialdehyde, acetone-dicarboxylic-acid-diethylesters and methylamine with acid.

We have found that by a partial saponification of the tropinone-dicarboxylic acid esters, tropinone-monocarboxylic acid esters of great technical importance may be obtained. It could not be foreseen, that on the one hand the saponification only of one of the ester groups would proceed smoothly and be successful and that on the other hand the freed carboxyl component could be separated without the remaining molecule itself suffering any further decomposition as the compound next arising through the partial saponification of the di-esters containing a strong basic group and a free carboxyl component, might, in consequence of the inner formation of a salt set up a resistance against the separation of $CO_2$, as is for example: glycocoll or ecgonine.

*Example.*

28 parts tropinone-dicarboxylic-acid-diethyl ester (thick, slightly basic oil which can be obtained by condensation of acetone-dicarboxylic-acid-esters with succinic-dialdehyde and methylamine) are dissolved in 50 parts of alcohol. Thereto 22 parts caustic potash solution (1:1) are added and heating the whole for a short time until boiling. After cooling some ice is added, and this is followed by acidification with sulphuric acid, supersaturation with ammonia and complete extraction with ether or with chlorinated hydrocarbons.

The tropinone-monocarboxylic-acid-ethyl ester is an oil which with 2 mols of water easily forms a crystalline hydrate melting at about 63 degrees C.

Having thus described our invention, we claim as new and desire to secure by Letters Patent:

1. The process of preparing tropinone mono-carboxylic acid ethylesters by heating tropinone dicarboxylic acid esters in aqueous solution of alkali.

2. The process of preparing tropinone mono-carboxylic acid ethlesters by heating tropinone dicarboxylic acid diethylester in aqueous solution of alkali.

3. The process of preparing tropinone mono-carboxylic acid esters by heating tropinone dicarboxylic acid esters with acids in aqueous solution.

4. The process of preparing tropinone mono-carboxylic acid ethylester by heating tropinone dicarboxylic acid diethylester with acids in aqueous solution.

In testimony whereof we have hereunto signed our names in the presence of the two subscribing witnesses.

DR. OTTO WOLFES.
DR. HORST MAEDER.

Witnesses:
 AUME DICK,
 BURT SCHOLER.